US009535550B2

(12) United States Patent
Levesque et al.

(10) Patent No.: US 9,535,550 B2
(45) Date of Patent: Jan. 3, 2017

(54) SYSTEMS AND METHODS FOR DEFORMATION-BASED HAPTIC EFFECTS

(71) Applicant: Immersion Corporation, San Jose, CA (US)

(72) Inventors: Vincent Levesque, Montreal (CA); Danny Grant, Laval (CA); Juan Manuel Cruz-Hernandez, Montreal (CA); Ali Modarres, Montreal (CA); William Rihn, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 47 days.

(21) Appl. No.: 14/552,987

(22) Filed: Nov. 25, 2014

(65) Prior Publication Data

US 2016/0147333 A1    May 26, 2016

(51) Int. Cl.
  *G06F 3/044*    (2006.01)
  *G06F 3/01*    (2006.01)
  (Continued)

(52) U.S. Cl.
  CPC .............. *G06F 3/044* (2013.01); *G06F 3/016* (2013.01); *G06F 3/017* (2013.01); *G06F 3/0338* (2013.01);
  (Continued)

(58) Field of Classification Search
  CPC ...... G06F 1/1652; G06F 3/016; G06F 3/0338; G06F 3/0416; G06F 3/044; G06F 2203/04102; G06F 3/0412
  See application file for complete search history.

(56) References Cited

U.S. PATENT DOCUMENTS 6,160,540 A    12/2000  Fishkin et al.
6,703,924 B2    3/2004  Tecu et al.
(Continued)

FOREIGN PATENT DOCUMENTS

EP    2 626 775    8/2013
EP    2 703 952    3/2014
(Continued)

OTHER PUBLICATIONS

Ahmaniemi et al., "What is a Device Bend Gesture Really Good for?", Apr. 2014, CHI '14 Proceedings of the SIGCHI Conference on Human Factors in Computing Systems, pp. 3503-3512.*
(Continued)

*Primary Examiner* — Larry Sternbane
(74) *Attorney, Agent, or Firm* — Kilpatrick Townsend & Stockton LLP

(57) ABSTRACT

One illustrative system disclosed herein includes a deformation sensor configured to detect a deformation of a deformable surface and transmit a first sensor signal associated with the deformation. The system also includes a sensor configured to detect a user interaction with a user input device and transmit a second sensor signal associated with the user interaction. The system further includes a processor configured to: receive the first sensor signal; receive the second sensor signal; execute a function based at least in part on the first sensor signal and the second sensor signal. The processor is also configured to: determine a haptic effect based at least in part on the first sensor signal or the second sensor signal; and transmit a haptic signal associated with the haptic effect to a haptic output device configured to receive the haptic signal and output the haptic effect.

21 Claims, 6 Drawing Sheets

(51) Int. Cl.
*H04M 1/725* (2006.01)
*G06F 3/0487* (2013.01)
*H04M 1/02* (2006.01)
*G06F 3/0488* (2013.01)
*G06F 3/041* (2006.01)
*G06F 3/0338* (2013.01)

(52) U.S. Cl.
CPC ........... *G06F 3/0416* (2013.01); *G06F 3/0487* (2013.01); *G06F 3/04886* (2013.01); *H04M 1/0268* (2013.01); *H04M 1/7253* (2013.01); *G06F 2203/0381* (2013.01); *G06F 2203/04809* (2013.01)

(56) References Cited

U.S. PATENT DOCUMENTS

| | | |
|---|---|---|
| 2002/0021277 A1 | 2/2002 | Kramer et al. |
| 2004/0008191 A1 | 1/2004 | Poupyrev et al. |
| 2007/0236450 A1 | 10/2007 | Colgate et al. |
| 2008/0303782 A1 | 12/2008 | Grant et al. |
| 2009/0096632 A1 | 4/2009 | Ullrich et al. |
| 2010/0013761 A1 | 1/2010 | Birnbaum et al. |
| 2010/0056223 A1 | 3/2010 | Choi et al. |
| 2010/0090813 A1 | 4/2010 | Je et al. |
| 2010/0225600 A1 | 9/2010 | Dai et al. |
| 2010/0231367 A1 | 9/2010 | Cruz-Hernandez et al. |
| 2010/0231508 A1 | 9/2010 | Cruz-Hernandez et al. |
| 2010/0231539 A1 | 9/2010 | Cruz-Hernandez et al. |
| 2010/0231540 A1 | 9/2010 | Cruz-Hernandez et al. |
| 2010/0231541 A1 | 9/2010 | Cruz-Hernandez et al. |
| 2010/0231550 A1 | 9/2010 | Cruz-Hernandez et al. |
| 2010/0283731 A1 | 11/2010 | Grant et al. |
| 2010/0302199 A1 | 12/2010 | Taylor et al. |
| 2011/0191674 A1 | 8/2011 | Rawley et al. |
| 2011/0227872 A1 | 9/2011 | Huska et al. |
| 2011/0267294 A1 | 11/2011 | Kildal |
| 2012/0139844 A1 | 6/2012 | Ramstein et al. |
| 2012/0169609 A1 | 7/2012 | Britton |
| 2012/0229400 A1 | 9/2012 | Birnbaum et al. |
| 2012/0268412 A1 | 10/2012 | Cruz-Hernandez et al. |
| 2013/0009882 A1 | 1/2013 | Salmela |
| 2013/0009892 A1 | 1/2013 | Salmela |
| 2013/0201115 A1 | 8/2013 | Heubel |
| 2013/0241860 A1 | 9/2013 | Ciesla et al. |
| 2013/0265262 A1 | 10/2013 | Jung et al. |
| 2013/0293453 A1 | 11/2013 | Hwang |
| 2014/0049463 A1 | 2/2014 | Seo et al. |
| 2014/0055345 A1* | 2/2014 | Seo ..................... G06F 1/1643 345/156 |
| 2014/0098028 A1 | 4/2014 | Kwak et al. |
| 2014/0253302 A1 | 9/2014 | Levesque et al. |
| 2014/0267013 A1 | 9/2014 | Grant et al. |
| 2014/0267065 A1 | 9/2014 | Levesque |
| 2014/0313142 A1 | 10/2014 | Yairi |
| 2014/0320393 A1 | 10/2014 | Modarres |
| 2014/0320396 A1 | 10/2014 | Modarres et al. |
| 2014/0320431 A1 | 10/2014 | Cruz-Hernandez et al. |
| 2014/0320435 A1 | 10/2014 | Modarres et al. |
| 2014/0362014 A1 | 12/2014 | Ullrich et al. |
| 2015/0009168 A1 | 1/2015 | Levesque et al. |
| 2015/0022472 A1* | 1/2015 | Jung ..................... G06F 3/0487 345/173 |
| 2015/0054727 A1 | 2/2015 | Saboune et al. |
| 2015/0145657 A1 | 5/2015 | Levesque et al. |
| 2015/0286288 A1* | 10/2015 | Lee ..................... G06F 3/03 345/173 |
| 2016/0054799 A1 | 2/2016 | Levesque et al. |

FOREIGN PATENT DOCUMENTS

| | | |
|---|---|---|
| EP | 2 750 015 | 7/2014 |
| WO | WO 2013/004919 | 1/2013 |

OTHER PUBLICATIONS

Ahmaniemi et al., What is a device bend gesture really good for? CHI 2014, One of a CHInd, Toronto, ON, Canada, Apr. 26-May 1, 2014, pp. 3503-3512.
U.S. Appl. No. 14/336,548, filed Jul. 21, 2014, Levesque et al.
U.S. Appl. No. 14/302,147, filed Jun. 11, 2014, Ullrich et al.
Bau, O. et al., TeslaTouch: Electrovibration for Touch Surfaces, UIST '10 Proceedings of the 23nd annual ACM symposium on User interface software and technology, pp. 283-292, 2010.
Levesque, V. et al., Exploring the Design Space of Programmable Friction for Scrolling Interactions, 2012 IEEE Haptics Symposium (HAPTICS), pp. 23-30, Mar. 2012.
Mistry, P. et al., SixthSense: A Wearable Gestural Interface, Proceeding—SIGGRAPH Asia '09 ACM SIGGRAPH Asia 2009 Sketches , Article No. 11, 2009.
Roudaut, A. et al., Morphees: Toward High "Shape Resolution" in Self-Actuated Flexible Mobile Device, CHI'13, Apr. 27-May 2, 2013, Paris, France.
Morphees: Shape-shifting mobile devices, BIG Bristol Interaction and Graphics, web page at http://big.cs.bris.ac.uk/projects/morphees, as available via the Internet and printed Dec. 5, 2014.
European Patent Office, European Search Report, Application No. 15180441 dated Dec. 11, 2015.
United States Patent and Trademark Office, Office Action, U.S. Appl. No. 14/465,005 dated Oct. 20, 2016.

* cited by examiner

SYSTEMS AND METHODS FOR DEFORMATION-BASED HAPTIC EFFECTS

FIELD OF THE INVENTION

The present invention relates to the field of user interface devices. More specifically, the present invention relates to deformation-based haptic effects.

BACKGROUND

As computer-based systems become more prevalent, the quality of the interfaces through which humans interact with these systems is becoming increasingly important. One interface that is of growing popularity due to its intuitive and interactive nature is the touchscreen display. Through a touchscreen display, a user can perform a variety of tasks by contacting a region of the touchscreen with the user's finger. To create a more intuitive and enhanced user experience, designers often leverage user experience with physical interactions. This is generally done by reproducing some aspects of interactions with the physical world through visual, audio, and/or haptic feedback (e.g., a mechanical vibration).

Recently, computing devices have been developed that are deformable. These deformable devices can be bent, squeezed, flexed, twisted, folded, and/or rolled. There is a need for additional interfaces for these deformable computing devices.

SUMMARY

Embodiments of the present disclosure comprise deformation-based haptic effects. In one embodiment, a system of the present disclosure may comprise: a deformation sensor configured to detect a deformation of a deformable surface and transmit a first sensor signal associated with the deformation. The system may also comprise a sensor configured to detect a user interaction with a user input device and transmit a second sensor signal associated with the user interaction. The system may further comprise a processor in communication with the deformable surface and the user input device, the processor configured to: receive the first sensor signal; receive the second sensor signal; and execute a function based at least in part on the first sensor signal and the second sensor signal. The processor may further be configured to: determine a haptic effect based at least in part on the first sensor signal or the second sensor signal and transmit a haptic signal associated with the haptic effect. The system may also comprise a haptic output device in communication with the processor, the haptic output device configured to receive the haptic signal and output the haptic effect.

In another embodiment, a method of the present disclosure may comprise: receiving a first sensor signal associated with a deformation of a deformable surface; and receiving a second sensor signal associated with a user interaction with a user input device. The method may also comprise executing a function based at least in part on the first sensor signal and the second sensor signal. The method may further comprise: determining a haptic effect based at least in part on the first sensor signal or the second sensor signal, and transmitting a haptic signal associated with the haptic effect to a haptic output device. The haptic output device may be configured to receive the haptic signal and output the haptic effect. Yet another embodiment comprises a computer-readable medium for implementing such a method.

These illustrative embodiments are mentioned not to limit or define the limits of the present subject matter, but to provide examples to aid understanding thereof. Further embodiments are discussed in the Detailed Description, and additional description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
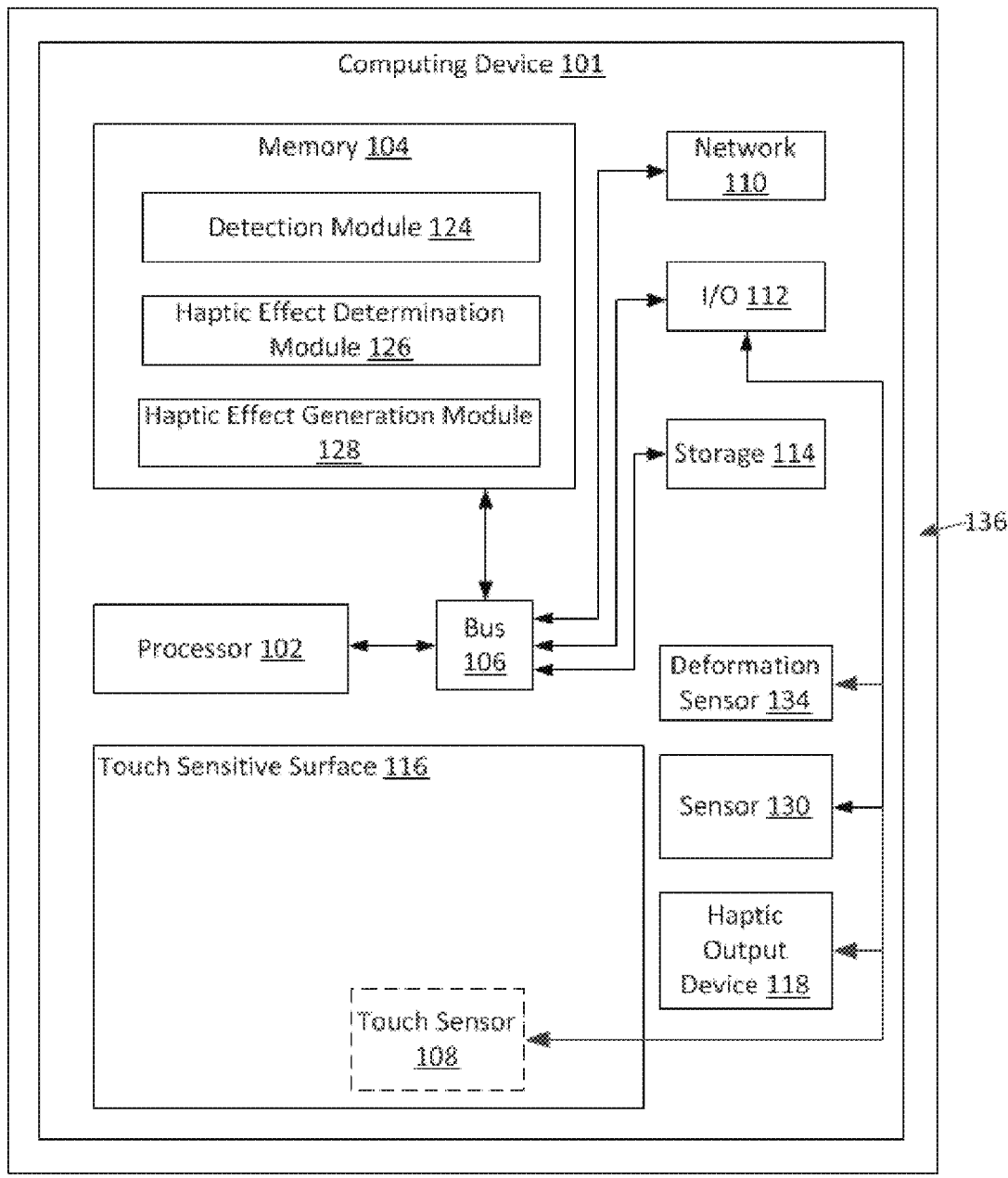
FIG. 1 is a block diagram showing a system for deformation-based haptic effects according to one embodiment.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations that come within the scope of the appended claims and their equivalents.

Illustrative Examples of Deformation-Based Haptic Effects

One illustrative embodiment of the present disclosure comprises a computing device with a memory, a touch-screen display, and a processor in communication with each of these components. The computing device may be, for example, a mobile phone, tablet, laptop computer, pocket organizer, game controller, remote control, or portable music player.

In the illustrative embodiment, computing device and/or the touch-screen display is deformable (e.g., flexible, foldable, bendable, twistable, stretchable, squeezable, or rollable). The computing device is configured to detect a deformation and transmit a first sensor signal associated with the deformation to the processor. In the illustrative embodiment, the computing device is also configured to detect a user interaction with the touch-screen display and transmit a second sensor signal to the processor. A user interaction may comprise, for example, gesturing (e.g., a swipe or two-finger pinch) along or tapping on the touch-screen display.

In the illustrative embodiment, the computing device is configured to determine, based at least in part on the user interaction and the deformation, a function to perform. A function, as used herein, comprises a task associated with an application executing on the computing device. In some embodiments, a function may comprise manipulating a virtual object (e.g., a virtual button, slider, image, or widget), selecting a program option or setting, changing a parameter of a program or setting, changing an input state, inputting data, outputting data, recording a sound, outputting a sound, performing a calculation, sending data, or receiving data. The computing device may then execute the function.

For example, in the illustrative embodiment, the computing device is executing a chat application. The computing device may output a virtual keyboard on the touch-screen display so the user can input a chat message. The virtual keyboard keys may be lowercase letters by default. The user may be able to bend the computing device to switch the virtual keyboard keys between lowercase letters, uppercase letters, and special characters (e.g., an exclamation point or @ symbol). For example, the user may bend the computing device (e.g., from an unbent configuration) downward with an amount that is above a threshold (e.g., 10 degrees) to change the lowercase letters to special characters. The user may bend the computing device (e.g., from an unbent configuration) upward with an amount that is above another threshold (e.g., 15 degrees) to change the lowercase lettering to uppercase lettering. In the illustrative embodiment, the computing device is configured to detect the amount and direction of the bend and change the virtual keyboard letters accordingly. For example, the user may bend the computing device upwards and tap an uppercase letter "A" on the virtual keyboard. The computing device may detect the tap and execute a function, for example, inserting an uppercase letter "A" into a text message.

In the illustrative embodiment, the computing device further comprises a haptic output device for providing a haptic effect (e.g., a vibration) to the user. In the illustrative embodiment, the computing device is configured to determine a haptic effect based on the deformation. For example, the computing device may determine a haptic effect comprising a low-intensity vibration if the user bends downward 10 degrees (e.g., to change the keyboard keys to special characters). As another example, the computing device may determine a haptic effect comprising a high-intensity vibration if the user bends the device upwards 15 degrees (e.g., to change the keyboard keys to uppercase letters). As still another example, the computing device may output a haptic effect to signify a change in the keyboard keys, regardless of the content of the keyboard keys (e.g., regardless of whether the keyboard keys are uppercase letters, lowercase letters, or special characters). This may allow the user to distinguish between input modes, or to determine an input mode has changed, without having to look at the touch-screen display.

In the illustrative embodiment, the computing device is also configured to output a haptic effect associated with the user interaction and/or the function. For example, upon the user tapping the uppercase letter "A" on the virtual keyboard, the computing device may output a haptic effect comprising a click sensation. This may confirm to the user that the computing device has received the user's input, without the user having to look at the touch-screen display. As another example, upon the user placing a finger over a letter on the virtual keyboard, the computing device may output a texture configured to simulate a plastic button. This may allow the user to determine the locations of keyboard keys, without having to look at the touch-screen display. In some embodiments, upon the user placing a finger over a letter on the virtual keyboard, the computing device may output different haptic effects if the letter comprises an uppercase letter, a lowercase letter, a special character, or a vowel. This may allow the user to determine a characteristic of the letter, without having to look at the touch-screen display.

Although the terms "upward" and "downward" are used herein, these terms are not meant to limit the present subject matter. The terms "upward" and "downward" are used to indicate manipulation of an object in a first direction and a second direction, wherein the second direction may or may not be opposite to the first direction. For example, bending an object "upward" and "downward" might also be characterized as bending an object inward and outward, respectively.

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Deformation-Based Haptic Effects

Figure 2:
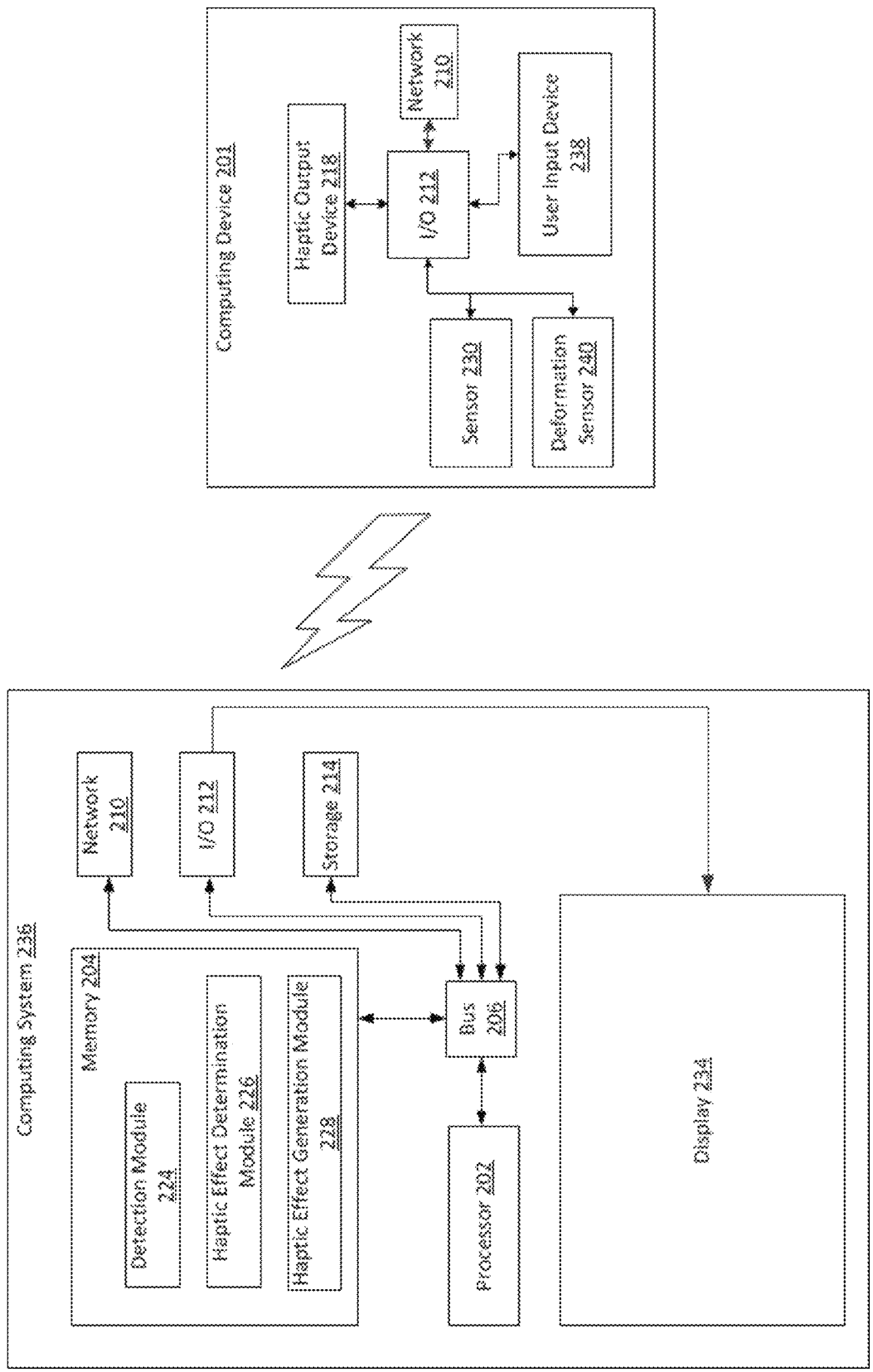
FIG. 2 is a block diagram showing a system for deformation-based haptic effects according to another embodiment.

FIG. 1 is a block diagram showing a computing device 101 for deformation-based haptic effects according to one embodiment. The computing device 101 may comprise, for example, a mobile phone, tablet, e-reader, laptop computer, portable gaming device, medical device, stereo, remote control, or gaming controller. In other embodiments, the computing device 101 may comprise a multifunction controller, for example, a controller for use in a kiosk, automobile, alarm system, thermostat, or other type of electronic device. While computing device 101 is shown as a single device in FIG. 1, in other embodiments, the computing device 101 may comprise multiple devices, for example, as shown in FIG. 2.

The computing device 101 is flexible, foldable, bendable, twistable, squeezable, stretchable, rollable, and/or otherwise deformable. For example, in some embodiments, the computing device 101 may comprise two or more rigid components coupled by one or more hinges. The computing device 101 may deform (e.g., fold) by pivoting the two or more rigid components about the one or more hinges. In other embodiments, the computing device 101 may comprise one or more bumpers 136. The bumpers 136 may be coupled to the sides of the computing device 101. For example, bumpers 136 may be coupled to the top, bottom, left, and right of the computing device 101, respectively. In the embodiment shown in FIG. 1, a single bumper 136 is positioned around the entire circumference of the computing device 101. The bumper 136 may be moveable, squeezable, stretchable, or otherwise deformable. A user may interact with the bumper(s) 136 to provide input to the computing device 101.

The computing device 101 comprises a processor 102 interfaced with other hardware via bus 106. A memory 104, which can comprise any suitable tangible (and non-transitory) computer-readable medium such as RAM, ROM, EEPROM, or the like, may embody program components that configure operation of the computing device 101. In some embodiments, the computing device 101 may further comprise one or more network interface devices 110, input/output (I/O) interface components 112, and additional storage 114.

Network interface device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate a connection to devices such as one or more displays, keyboards, mice, speakers, microphones, buttons, joysticks, and/or other hardware used to input data or output data. Additional storage 114 represents nonvolatile storage such as read-only memory, flash memory, ferroelectric RAM (F-RAM), magnetic, optical, or other storage media included in the computing device 101 or coupled to processor 102.

The computing device 101 includes a touch-sensitive surface 116. In the embodiment shown in FIG. 1, the touch-sensitive surface 116 is integrated into computing device 101. In other embodiments, the computing device 101 may not comprise the touch-sensitive surface 116. Touch-sensitive surface 116 represents any surface that is configured to sense tactile input of a user. In some embodiments, the touch-sensitive surface 116 may be rollable, bendable, foldable, stretchable, twistable, squeezable, or otherwise deformable. For example, the touch-sensitive surface 116 may comprise a bendable electronic paper.

One or more touch sensors 108 are configured to detect a touch in a touch area when an object contacts a touch-sensitive surface 116 and provide appropriate data for use by processor 102. Any suitable number, type, or arrangement of sensors can be used. For example, resistive and/or capacitive sensors may be embedded in touch-sensitive surface 116 and used to determine the location of a touch and other information, such as pressure, speed, and/or direction. As another example, optical sensors with a view of the touch-sensitive surface 116 may be used to determine the touch position.

In other embodiments, the touch sensor 108 may comprise a LED (Light Emitting Diode) detector. For example, in some embodiments, touch-sensitive surface 116 may comprise a LED finger detector mounted on the side of a display. In some embodiments, the processor 102 is in communication with a single touch sensor 108. In other embodiments, the processor 102 is in communication with a plurality of touch sensors 108, for example, touch sensors associated with a first touch-screen and a second touch screen. The touch sensor 108 is configured to detect user interaction, and based on the user interaction, transmit signals to processor 102. In some embodiments, touch sensor 108 may be configured to detect multiple aspects of the user interaction. For example, touch sensor 108 may detect the speed and pressure of a user interaction, and incorporate this information into the signal.

In some embodiments, computing device 101 may include a touch-enabled display that combines a touch-sensitive surface 116 and a display. The touch-sensitive surface 116 may correspond to the display exterior or one or more layers of material above components of the display. In other embodiments, touch-sensitive surface 116 may not comprise (or otherwise correspond to) a display, depending on the particular configuration of the computing device 101.

The computing device 101 also comprises a deformation sensor 134. The deformation sensor 134 is configured to detect deformations (e.g., bending, flexing, stretching, folding, twisting, squeezing, or rolling) of a surface. For example, the deformation sensor 134 may be configured to detect deformations in the computing device 101, the bumper(s) 136, and/or touch-sensitive surface 116. In some embodiments, the deformation sensor 134 may comprise a pressure sensor, strain gauge, a force sensor, a range sensor, a depth sensor, a 3D imaging system (e.g., the 3D imagining system commonly sold under the trademark Microsoft Kinect®), and/or a LED-based tracking system (e.g., external to the computing device 101). In other embodiments, the deformation sensor 134 may comprise a smart gel, fluid, and/or piezoelectric device. The smart gel, fluid, and/or piezoelectric device may generate a voltage based on the deformation. For example, a layer of smart gel may be coupled to the surface. The smart gel may generate an amount of voltage associated with an amount of deformation (e.g., bending) in the surface.

The deformation sensor 134 is configured to transmit a sensor signal (e.g., a voltage) to the processor 102. Although the embodiment shown in FIG. 1 depicts the deformation sensor 134 internal to computing device 101, in some embodiments, the deformation sensor 134 may be external to computing device 101 (e.g., as shown in FIG. 2). For example, in some embodiments, the one or more deformation sensors 134 may be associated with a game controller for use with a computing device 101 comprising a game system.

The computing device 101 also comprises one or more additional sensor(s) 130. The sensor(s) 130 are configured to transmit sensor signals to the processor 102. In some embodiments, the sensor(s) 130 may comprise, for example, a camera, humidity sensor, ambient light sensor, gyroscope, GPS unit, accelerometer, range sensor or depth sensor, biorhythm sensor, or temperature sensor. Although the embodiment shown in FIG. 1 depicts the sensor 130 internal to computing device 101, in some embodiments, the sensor 130 may be external to computing device 101. For example, in some embodiments, the one or more sensors 130 may be associated with a game controller for use with a computing device 101 comprising a game system. In some embodiments, the processor 102 may be in communication with a single sensor 130 and, in other embodiments, the processor 102 may be in communication with a plurality of sensors 130, for example, a temperature sensor and a humidity sensor. In some embodiments, the sensor 130 may be remote from computing device 101, but communicatively coupled to processor 102, for example, as shown in FIG. 2.

Computing device 101 further includes haptic output device 118 in communication with the processor 102. The haptic output device 118 is configured to output a haptic effect in response to a haptic signal. In some embodiments, the haptic output device 118 is configured to output a haptic effect comprising, for example, a vibration, a change in a perceived coefficient of friction, a simulated texture, a change in temperature, a stroking sensation, an electro-tactile effect, or a surface deformation (i.e., a deformation of a surface associated with the computing device 101). Although a single haptic output device 118 is shown here, some embodiments may comprise multiple haptic output devices 118 of the same or different type that can be actuated in series or in concert to produce haptic effects.

In the embodiment shown in FIG. 1, the haptic output device 118 is internal to computing device 101. In other embodiments, the haptic output device 118 may be remote from computing device 101, but communicatively coupled to processor 102, for example, as shown in FIG. 2. For instance, haptic output device 118 may be external to and in communication with computing device 101 via wired interfaces such as Ethernet, USB, IEEE 1394, and/or wireless interfaces such as IEEE 802.11, Bluetooth, or radio interfaces.

In some embodiments, the haptic output device 118 may be configured to output a haptic effect comprising a vibration. In some such embodiments, the haptic output device 118 may comprise one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In some embodiments, the haptic output device 118 may be configured to output a haptic effect modulating the perceived coefficient of friction on along a surface of the computing device 101 in response to a haptic signal. In some such embodiments, the haptic output device 118 may comprise an ultrasonic actuator. The ultrasonic actuator may comprise a piezo-electric material. An ultrasonic actuator may vibrate at an ultrasonic frequency, for example 20 kHz, increasing or reducing the perceived coefficient at the surface of touch-sensitive surface 116.

In some embodiments, the haptic output device 118 may use electrostatic attraction, for example by use of an electrostatic actuator, to output a haptic effect. The haptic effect may comprise a simulated texture, a simulated vibration, a stroking sensation, or a perceived change in a coefficient of friction on a surface associated with computing device 101 (e.g., touch-sensitive surface 116). In some embodiments, the electrostatic actuator may comprise a conducting layer and an insulating layer. The conducting layer may be any semiconductor or other conductive material, such as copper, aluminum, gold, or silver. The insulating layer may be glass, plastic, polymer, or any other insulating material. Furthermore, the processor 102 may operate the electrostatic actuator by applying an electric signal, for example an AC signal, to the conducting layer. In some embodiments, a high-voltage amplifier may generate the AC signal. The electric signal may generate a capacitive coupling between the conducting layer and an object (e.g., a user's finger or a stylus) near or touching the haptic output device 118. In some embodiments, varying the levels of attraction between the object and the conducting layer can vary the haptic effect perceived by a user.

In some embodiments, the haptic output device 118 may comprise a deformation device configured to output a deformation haptic effect. In some such embodiments, the deformation haptic effect may be configured to raise or lower portions of a surface associated with the computing device (e.g., the touch-sensitive surface 116). In other embodiments, the deformation haptic effect may comprise bending, folding, rolling, twisting, squeezing, flexing, changing the shape of, or otherwise deforming the computing device 101 or a surface associated with the computing device 101 (e.g., the touch-sensitive surface 116). For example, the deformation haptic effect may apply a force on the computing device 101 (or a surface associated with the computing device 101), causing it to bend, fold, roll, twist, squeeze, flex, change shape, or otherwise deform. Further, in some embodiments, the deformation haptic effect may comprise preventing or resisting the computing device 101 or a surface associated with the computing device 101 from bending, folding, rolling, twisting, squeezing, flexing, changing shape, or otherwise deforming.

In some embodiments, the haptic output device 118 may comprise fluid configured for outputting a haptic effect (e.g., configured to deform a surface associated with the computing device 101 or apply a force to a user input device). For example, in some embodiments, the fluid may comprise a smart gel. The smart gel may comprise mechanical or structural properties that change in response to a stimulus or stimuli (e.g., an electric field, a magnetic field, temperature, ultraviolet light, shaking, or a pH variation). For instance, in response to a stimulus, the smart gel may change in stiffness, volume, transparency, and/or color. In some embodiments, the stiffness may resist against, or assist the user in, deforming a surface associated with the computing device 101 or interacting with a user input device. For example, a smart gel layer may be positioned around a shaft of a joystick or within a button. In response to a stimulus, the smart gel may become rigid, which may prevent a user from operating the joystick or pressing the button. In some embodiments, one or more wires may be embedded in or coupled to the smart gel. As current runs through the wires, heat is emitted, causing the smart gel to expand, contract, or change rigidity. This may deform a surface associated with the computing device 101 or apply a force to the user input device.

As another example, in some embodiments, the fluid may comprise a rheological (e.g., a magneto-rheological or electro-rheological) fluid. A rheological fluid may comprise metal particles (e.g., iron particles) suspended in a fluid (e.g., oil or water). In response to an electric or magnetic field, the order of the molecules in the fluid may realign, changing the overall damping and/or viscosity of the fluid. This may cause a surface associated with the computing device 101 to deform or cause a force to be applied a user input device.

In some embodiments, the haptic output device 118 may comprise a mechanical deformation device. For example, the haptic output device 118 may comprise an actuator coupled to an arm that rotates a deformation component. The deformation component may comprise, for example, an oval, starburst, or corrugated shape. The deformation component may be configured to move a surface associated with the computing device 101 at some rotation angles but not others. In some embodiments, the actuator may comprise a piezo-electric actuator, rotating/linear actuator, solenoid, an electroactive polymer actuator, macro fiber composite (MFC) actuator, shape memory alloy (SMA) actuator, and/or other actuator. As the actuator rotates the deformation component, the deformation component may move the surface, causing it to deform. In some such embodiments, the deformation component may begin in a position in which the surface is flat. In response to receiving a signal from processor 102, the actuator may rotate the deformation component. Rotating the deformation component may cause one or more portions of the surface to raise or lower. The deformation component may, in some embodiments, remain in this rotated state until the processor 102 signals the actuator to rotate the deformation component back to its original position.

Other techniques or methods can be used to deform a surface associated with the computing device 101. For example, the haptic output device 118 may comprise a flexible surface layer configured to deform its surface or vary its texture based upon contact from a surface reconfigurable haptic substrate (e.g., fibers, nanotubes, electroactive polymers, piezoelectric elements, or shape memory alloys). In some embodiments, the haptic output device 118 may be deformed, for example, with a deforming mechanism (e.g., a motor coupled to wires), air or fluid pockets, local deformation of materials, resonant mechanical elements, piezoelectric materials, micro-electromechanical systems ("MEMS") elements or pumps, thermal fluid pockets, variable porosity membranes, or laminar flow modulation.

In some embodiments, the haptic output device 118 may be a portion of (or coupled to) the housing of the computing device 101. In other embodiments, the haptic output device 118 may be disposed within a flexible layer overlaying a surface associated with the computing device 101 (e.g., the front or back of the computing device 101). For example, the haptic output device 118 may comprise a layer of smart gel or rheological fluid positioned over a hinge in the computing device 101 (e.g., where the hinge is configured to allow the computing device 101 to fold or bend). Upon actuating the haptic output device 118 (e.g., with an electric current or an electric field), the smart gel or rheological fluid may change its characteristics. This may cause the computing device 101 to fold, bend, or flex, or prevent (e.g., resist against) the computing device 101 from folding, bending, or flexing.

The computing device 101 also includes memory 104. Memory 104 comprises program components 124, 126, and 128, which are depicted to show how a device can be configured in some embodiments to provide deformation-based haptic effects. The detection module 124 configures the processor 102 to monitor the deformation sensor 134 to detect a deformation in a surface associated with the computing device 101. For example, detection module 124 may sample the deformation sensor 134 to track the presence or absence of a bend in the surface and, if a bend is present, to track one or more of the amount, velocity, acceleration, pressure and/or other characteristics of the bend over time.

The detection module 124 also configures the processor 102 to monitor the touch-sensitive surface 116 via touch sensor 108 to determine a position of a touch. For example, detection module 124 may sample the touch sensor 108 in order to track the presence or absence of a touch and, if a touch is present, to track one or more of the location, path, velocity, acceleration, pressure and/or other characteristics of the touch over time. Although the detection module 124 is depicted in FIG. 1 as a program component within the memory 104, in some embodiments, the detection module 124 may comprise hardware configured to monitor the deformation sensor 134 and/or the touch sensor 108. In some embodiments, such hardware may comprise analog to digital converters, processors, microcontrollers, comparators, amplifiers, transistors, and other analog or digital circuitry.

Haptic effect determination module 126 represents a program component that analyzes data to determine a haptic effect to generate. The haptic effect determination module 126 comprises code that selects one or more haptic effects to output. In some embodiments, the haptic effect determination module 126 may comprise code that determines a haptic effect to output based on a signal from the deformation sensor 134. For example, deformations (e.g., bending the computing device 101 in varying amounts) may be mapped to functions (e.g., move to the next page in a virtual book, move several pages in the virtual book, or close the virtual book) associated with a user interface. Haptic effect determination module 126 may select different haptic effects based on the function. In other embodiments, the haptic effect determination module 126 may select haptic effects based on a characteristic of the deformation (e.g., the amount of bend in the computing device 101).

Haptic effect determination module 126 may also comprise code that determines, based on a signal from touch sensor 108 or another user interface device (e.g., a button, switch, joystick, wheel, or trigger), a haptic effect to output. For example, in some embodiments, some or all of the area of touch-sensitive surface 116 may be mapped to a graphical user interface. Haptic effect determination module 126 may select different haptic effects based on the location of a touch (e.g., in order to simulate the presence of a feature on the surface of touch-sensitive surface 116). In some embodiments, these features may correspond to a visible representation of the feature on the interface. However, haptic effects may be provided via touch-sensitive surface 116 or the display even if a corresponding element is not displayed in the interface (e.g., a haptic effect may be provided if a boundary in the interface is crossed, even if the boundary is not displayed).

In some embodiments, haptic effect determination module 126 may comprise code that determines a haptic effect to output based on the amount of pressure a user (e.g., the user's finger) exerts against the touch-sensitive surface 116 and/or computing device 101. For example, in some embodiments, haptic effect determination module 126 may select different haptic effects based on the amount of pressure a user exerts against the surface of touch-sensitive surface 116. In some embodiments, the amount of pressure a user exerts on the touch-sensitive surface 116 may affect the strength of the haptic effect perceived by the user. For example, in some embodiments, reduced pressure may cause the user to perceive a weaker haptic effect. The haptic effect determination module 126 may detect or determine this reduction in pressure and, in response, output or change a haptic effect to compensate for this change. For example, the haptic effect determination module may determine a more intense haptic effect to compensate for the reduced pressure. Thus, the haptic effect perceived by the user may remain the same as before the reduction in pressure.

In some embodiments, the haptic effect determination module 126 may select a haptic effect based at least in part a characteristic (e.g., a virtual size, width, length, color, texture, material, trajectory, type, movement, pattern, or location) associated with a virtual object. For example, the haptic effect determination module 126 may determine a haptic effect comprising a series of short, pulsed vibrations if a texture associated with the virtual object is coarse. As another example, the haptic effect determination module 126 may determine a haptic effect comprising a change in temperature if a color associated with the virtual object is red. As still another example, the haptic effect determination module 126 may determine a haptic effect configured to increase a perceived coefficient of friction if the virtual object comprises a texture that is rubbery.

In some embodiments, the haptic effect determination module 126 may comprise code that determines a haptic effect based at least in part on signals from sensor 130 (e.g., a temperature, an amount of ambient light, an accelerometer measurement, or a gyroscope measurement). For example, the haptic effect determination module 126 may determine a haptic effect based on a gyroscopic measurement (e.g., the relative position of the computing device 101 in real space). In some such embodiments, if the computing device 101 is tilted at a particular angle, the computing device 101 may output one or more corresponding haptic effects (e.g., a vibration).

Although the haptic effect determination module 126 is depicted in FIG. 1 as a program component within the memory 104, in some embodiments, the haptic effect determination module 126 may comprise hardware configured to determine one or more haptic effects to generate. In some embodiments, such hardware may comprise analog to digital converters, processors, microcontrollers, comparators, amplifiers, transistors, and other analog or digital circuitry.

Haptic effect generation module 128 represents programming that causes processor 102 to generate and transmit haptic signals to the haptic output device 118 to generate the selected haptic effect. For example, the haptic effect generation module 128 may access stored waveforms or commands to send to the haptic output device 118 to create the desired effect. In some embodiments, the haptic effect generation module 128 may comprise algorithms to determine the haptic signal. Further, in some embodiments, haptic effect generation module 128 may comprise algorithms to determine target coordinates for the haptic effect (e.g., coordinates for a location on the touch-sensitive surface 116 at which to output a haptic effect).

Although the haptic effect generation module 128 is depicted in FIG. 1 as a program component within the memory 104, in some embodiments, the haptic effect generation module 128 may comprise hardware configured to determine one or more haptic effects to generate. In some embodiments, such hardware may comprise analog to digital converters, processors, microcontrollers, comparators, amplifiers, transistors, and other analog or digital circuitry.

FIG. 2 is a block diagram showing a system for deformation-based haptic effects according to another embodiment. The system 200 comprises a computing system 236. In some embodiments, computing system 236 may comprise, for example, a game console, laptop computer, desktop computer, set-top box (e.g., DVD player, DVR, cable television box), or another computing system.

The computing system 236 comprises a processor 202 in communication with other hardware via bus 206. The computing system 236 also comprises a memory 204, which comprises a haptic effect detection module 224, haptic effect determination module 226, and haptic effect generation module 228. These components may be configured to function similarly to the memory 104, detection module 124, haptic effect determination module 126, and haptic effect generation module 128 depicted in FIG. 1, respectively.

The computing system 236 also comprises network interface device 210, I/O components 212, additional storage 214, and sensors 230. These components may be configured to function in similarly to the network interface device 110, I/O components 112, additional storage 114, and sensors 130 depicted in FIG. 1, respectively.

The computing system 236 further comprises a display 234. In some embodiments, the display 234 may comprise a separate component, e.g., a remote monitor, television, or projector coupled to processor 202 via a wired or wireless connection.

The computing system 236 is communicatively coupled to a computing device 201. The computing device 201 is flexible, foldable, bendable, twistable, squeezable, stretchable, rollable, and/or otherwise deformable. In some embodiments, the computing device 201 may comprise, for example, a game controller, remote control, or a mobile device.

The computing device 201 may comprise a processor (not shown), memory (not shown), haptic effect detection module 224 (not shown), haptic effect determination module 226 (not shown), and haptic effect generation module 228 (not shown). The computing device 201 may also comprise a network interface device 210. In this example, the computing device 201 comprises the network interface device 210 and is in communication with computing system 236 via a wireless interface, such as IEEE 802.11, Bluetooth, or radio interfaces (e.g., transceiver/antenna for accessing a CDMA, GSM, UMTS, or other mobile communications network).

The computing device 201 comprises I/O components 212, which may be configured to function in similar ways as the I/O 112 components depicted in FIG. 1. The computing device 201 also comprises a user input device 238 in communication with to the I/O components 212. The user input device 238 comprises a device for allowing user interaction with the computing device 201. For example, the user input device 238 may comprise a joystick, directional pad, button, switch, speaker, microphone, touch-sensitive surface, and/or other hardware used to input data.

The computing device 201 further comprises one or more sensors 230, deformation sensors 240, and haptic output devices 218. These components may be configured to function in similarly to the sensors 130, deformation sensors 134, and haptic output devices 118 depicted in FIG. 1, respectively.

Figure 3:
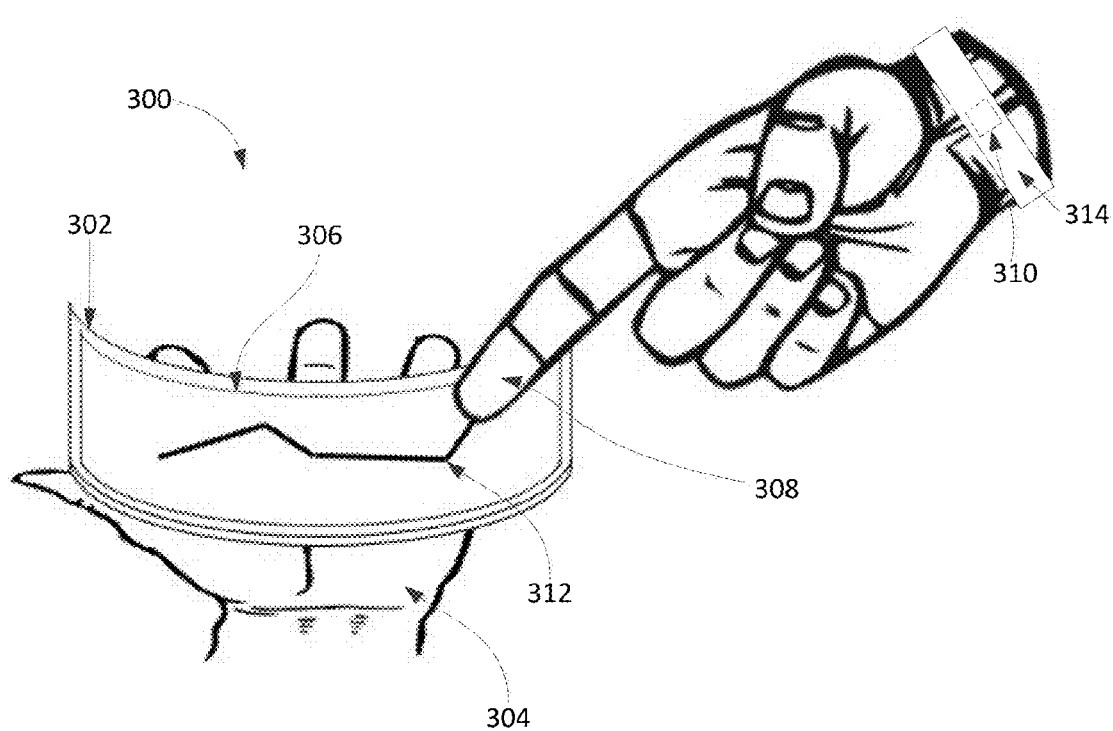
FIG. 3 shows an embodiment of a system for deformation-based haptic effects.

FIG. 3 shows an embodiment of a system for deformation-based haptic effects. The system 300 comprises a computing device 302 with a touch-screen display 306. In some embodiments, the computing device 302 may comprise a mobile phone (e.g., smartphone), tablet, game controller, or e-reader. In the embodiment shown in FIG. 3, the computing device 302 is executing a drawing application.

A user may flex, bend, twist, squeeze, fold, stretch, roll, or otherwise deform the computing device 302 to provide input to the computing device 302. Although depicted in FIG. 3 as comprising a noticeable amount of curvature or bend, in some embodiments, the computing device 302 may deform with an amount that is substantially imperceptible to a user. For example, the computing device 302 may bend less than 1 degree.

The computing device 302 is configured to detect the deformation. The computing device 302 may determine and execute a function associated with the deformation. In some embodiments, the computing device 302 may determine a function based on the amount of deformation exceeding or falling below a threshold (e.g., associated with the computing device 302 bending more than 15 degrees). In other embodiments, the computing device 302 may continuously determine functions as the computing device 302 is deformed. For example, in the embodiment shown in FIG. 1, the user is bending the computing device 302 with the user's left hand 304, e.g., to change a parameter or setting associated with the drawing application. For instance, the user may bend the computing device 302 upwards to increase the width of the paintbrush and downwards to decrease the width of the paintbrush. The computing device 302 may detect the amount of bend in the computing device 302 and correspondingly change the width of the paintbrush. In this manner, the computing device 302 may continuously change a parameter associated with the system or a program based on the deformation.

In some embodiments, deforming the computing device 302 may be associated with changing the size of the drawing canvas in the drawing application. For example, the user may bend the computing device 302 upwards to increase the size of the drawing canvas and downwards to decrease the size of the drawing canvas. As another example, the user may squeeze the computing device 302 to decrease the size of the drawing canvas and stretch the computing device 302 to increase the size of the drawing canvas. The computing device 302 may detect the deformation and, based on the deformation, increase or decrease the size of the drawing canvas.

The computing device 302 may output one or more haptic effects and/or sounds based on the deformation. For example, the computing device 302 may output a haptic effect based on the amount of deformation exceeding or falling below a threshold (e.g., upon the computing device 302 bending more than 15 degrees). In some embodiments, the characteristics of the haptic effects (e.g., magnitude, duration, waveform, type, and frequency) may be based on the characteristics of the deformation. For example, as the computing device 302 is increasingly bent upwards, the computing device 302 may output a haptic effect comprising an increasingly bumpy texture, e.g., output to the user's left hand 304 via the back of the computing device 302. As the computing device 302 is bent downwards, the computing device 302 may output a haptic effect comprising a decreasingly bumpy texture.

In some embodiments, the computing device 302 may be communicatively coupled to a haptic output device 310 external to the computing device 302. For example, the haptic output device 310 may be included in a wearable device 314. The wearable device 314 may comprise a shoe, armband, sleeve, jacket, glove, ring, watch, wristband, bracelet, article of clothing, hat, headband, jewelry, and/or glasses. In some embodiments, the computing device 302 may cause the external haptic output device 310 to output one or more haptic effects to a location (e.g., head, shoulder, arm, hand, foot, elbow, or leg) on the user's body. For example, as the computing device 302 is bent upwards, the computing device 302 may cause the haptic output device 310 to output haptic effects comprising vibrations with increasing frequencies to the user's wrist. As the computing device 302 is bent downwards, the computing device 302 may cause the haptic output device 310 to output haptic effects comprising vibrations with decreasing frequencies to the user's wrist.

The user may perceive the haptic effects and be able to determine the state of the computing device 302 and/or a parameter associated with a program (e.g., the drawing application). For example, the user may be able to perceive the bumpy texture, or the vibrations on the user's wrist, and determine the width of the paintbrush, the size of the drawing canvas, or the level of zoom in the drawing application.

In some embodiments, the user may interact with a touch-screen display 306 and/or another input component (e.g., button, joystick, switch, wheel, or trigger) associated with the computing device 302. For example, the user may drag a finger 308 (e.g., on the user's right hand) along the surface of the touch-screen display 306, e.g., to draw a picture using the drawing application. The computing device 302 is configured to detect the user interaction and execute a function associated with the user interaction and the deformation. For example, as the user drags a finger 308 along the surface of the touch-screen display 306, the computing device 302 may determine a function comprising outputting a line with a shape defined by the path of the user's finger. The computing device 302 may determine the width of the line based on the deformation in the computing device 302. The computing device 302 may then output the line with the determined shape and width.

In some embodiments, the computing device 302 may output one or more haptic effects (and/or sounds) associated with the user interaction. For example, the computing device 302 may physically raise portions of the touch-screen display 306 corresponding to the shape and width of the line 312 output on the touch-screen display 306. The user may be able to exit the drawing mode and move a finger 308 along the surface of the touch-screen display 306 to physically perceive the location, width, and other characteristics of the line 312.

Although the computing device 302 is described above as executing a drawing application, in other embodiments, the computing device 302 may be executing other programs, such as a game. For example, the computing device 302 may be executing a virtual guitar game. The user may bend the computing device 302 (e.g., with the user's left hand 304) upwards or downwards to correspondingly change the intensity associated with playing the virtual guitar. A higher intensity, which may be associated with a greater upwards bend, may simulate a user playing the virtual guitar with greater speed or pressure. The user may substantially simultaneously gesture along the touch-screen display 306 (e.g., with a finger 308 on the user's right hand) to, for example, strum the guitar strings. The computing device 302 may detect the gesture and output a haptic effect comprising a vibration with a magnitude based on the intensity. For example, as the intensity increases, the computing device 302 may output a vibration with a higher magnitude. As the intensity decreases, the computing device 302 may output a vibration with a lower magnitude. Further, in some embodiments, the computing device 302 may output sound associated with strumming the guitar. The volume (e.g., amplitude) of the sound may be based on the intensity. For example, as the intensity increases, the computing device 302 may output sound that has a higher volume. As the intensity decreases, the computing device 302 may output sound with a lower volume.

Figure 4:
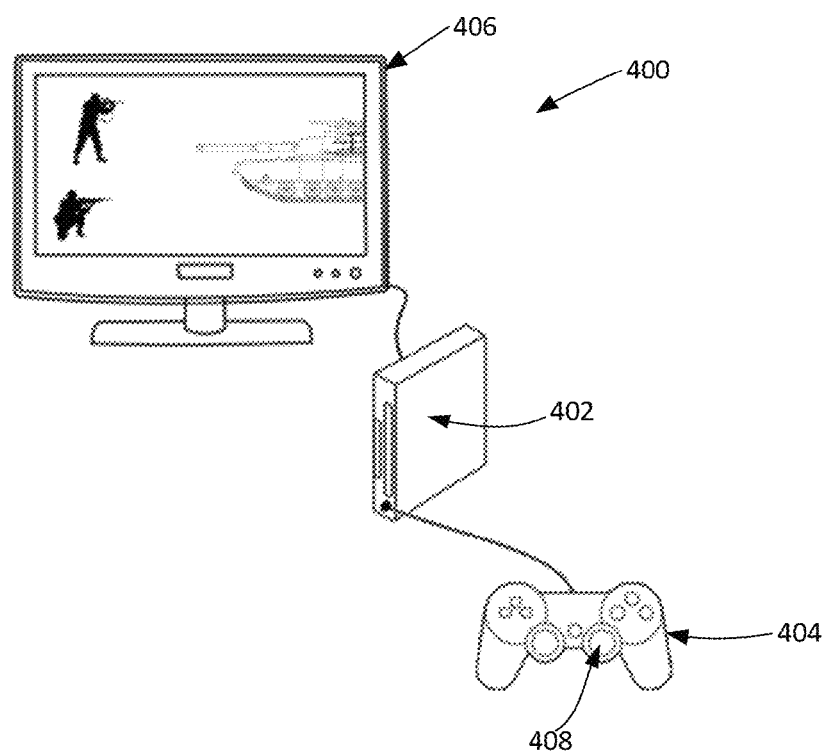
FIG. 4 shows another embodiment of a system for deformation-based haptic effects.

FIG. 4 shows another embodiment of a system for deformation-based haptic effects. The system 400 comprises a computing system 402 which, in this example, comprises a game station. The computing system 402 is executing a video game (e.g., a military game). The computing system 402 may be in wired or wireless communication with a computing device 404. In this example, the computing device 404 comprises a game controller. The computing device 404 is flexible, foldable, bendable, twistable, stretchable, squeezable, rollable, and/or otherwise deformable.

In some embodiments, a user may deform the computing device 404, for example, to zoom in or out on an enemy combatant with a virtual weapon. For instance, the user may bend the computing device 404 upwards to cause their virtual weapon to zoom in. The user may bend the computing device 404 downwards to cause the virtual weapon to zoom out. The computing device 404 may detect the bend and cause the computing system 402 to update the display 406, for example, to display cross hairs that are zoomed in or out, respectively.

In some embodiments, the computing device 404 to output a haptic effect associated with the deformation. For example, the computing device 404 may output vibrations with increasing amplitudes as the user zooms in, and vibrations with a decreasing amplitudes as the user zooms out. This may make it more challenging for the user to accurately fire at the enemy combatant if the user's virtual weapon is zoomed in. This may promote close-range interactions between users (e.g., rather than sniping or "camping", in which a user waits in a location for an extended period of time for an opponent to come within actionable range of the user).

The user may interact with one or more controls on the computing device 404. For example, the user may interact with a touch-sensitive surface, a button, a switch, a trigger, a wheel, a directional pad, a joystick 408, or other controls on the computing device 404. The computing device 404 may detect the user interaction and fire the user's virtual weapon with an accuracy based on the zoom level of the weapon (which may be based on the deformation in the computing device 404). In some embodiments, the computing device 404 may output a haptic effect associated with the user interaction. For example, upon the user pressing a button to cause the user's virtual character to fire a virtual weapon, the computing device 404 may output a haptic effect configured to simulate a gun shot. This may confirm to the user that the user's virtual weapon has been fired and further enhance the realism of the video game.

Although the embodiment shown in FIG. 4 depicts a military game, in some embodiments, the computing system 402 may be executing a hovercraft game. The user may be able to deform the computing device 404 to, for example, select a left rocket thruster or a right rocket thruster associated with a virtual hovercraft in the video game. For instance, the user may be able to hold the left side of the computing device 404 stationary while twisting the right side of the computing device 404 (e.g., with an amount above a threshold) to select the right thruster. The user may be able to hold the right side of the computing device 404 stationary while twisting the left side of the computing device 404 to select the left thruster. The computing device 404 may detect the deformation and cause the right or left thruster to be selected. In some embodiments, if a thruster has been selected, the computing device 404 may output a confirmatory haptic effect, e.g., comprising a click or thump. The user may press a trigger or button on the computing device 404, for example, to fire the selected thruster. The computing device 404 may detect the user input and cause the selected thruster to fire. The computing device 404 may also output a haptic effect comprising, for example, a rumbling sensation configured to simulate the firing of a rocket thruster.

Figure 5:
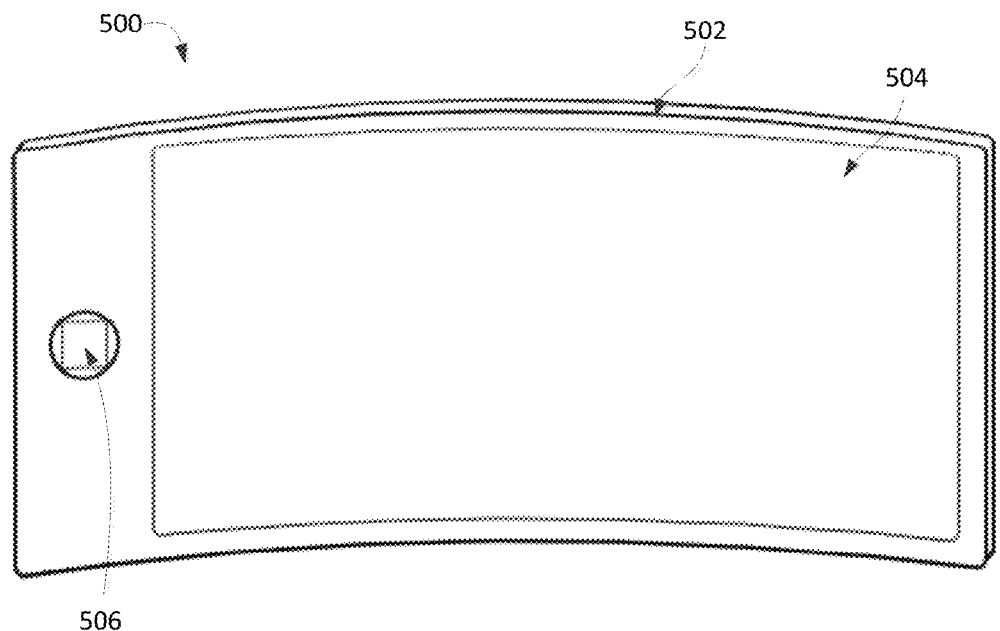
FIG. 5 shows yet another embodiment of a system for deformation-based haptic effects.

FIG. 5 shows yet another embodiment of a system for deformation-based haptic effects. The system 500 comprises a computing device 502 with a user interface. In this embodiment, the computing device 502 comprises a smartphone or tablet. The user interface comprises a button 506 and a touch-screen display 504.

In some embodiments, a user may play an archery or slingshot (or golf) game on the computing device 502. The user may bend the computing device 502, for example, to draw back the string on a virtual archery bow or the elastic band of a virtual slingshot (or a virtual golf club). In some embodiments, as the user bends the computing device 502, the computing device 502 may output a haptic effect configured to resist against the user's bend (and/or a sound, such as a creaking sound). This may simulate tension in the bow string or the elastic band of a slingshot as it is being drawn. Once the user has reached an amount of bend associated with the maximum possible tension level, the computing device 502 may output another haptic effect. For example, the computing device 502 may output a click sensation. In some embodiments, the user may be able to tap the touch-screen display 504 (or button 506) to fire the bow or slingshot. The strength of the shot may be based on the amount of bend in the computing device 502. In some embodiments, the computing device 502 may output an associated haptic effect that is configured to simulate firing the virtual bow or slingshot, such as a low-magnitude vibration. Additionally or alternatively, the computing device 502 may output a haptic effect configured to quickly unbend the computing device 502, returning the computing device 502 to its rest state (i.e., an un-deformed state). This may simulate the release of tension in the bow string or elastic band of the slingshot.

In some embodiments, the computing device 502 may execute multiple functions (e.g., associated with a virtual object) based on the deformation of the computing device 502. In some such embodiments, each function may be associated with a different deformation of the computing device 502. For example, the user may select a virtual weapon in a video game by tapping on the weapon on the touch-screen display 504 and bend the computing device 502 to perform different functions associated with the weapon. For instance, the computing device 502 may detect a bend above a first threshold and, for example, arm the virtual weapon. The computing device 502 may also output an associated haptic effect configured to, for example, simulate a clip being loaded into a weapon. The computing device 502 may detect a bend above a second threshold and, for example, fire the weapon. The computing device 502 may also output an associated haptic effect configured to, for example, simulate a gun shot. The computing device 502 may detect an amount of bend falling back between the first threshold and the second threshold and, for example, eject a used ammunition shell. The computing device 502 may also output an associated haptic effect configured to, for example, simulate an ammunition shell being ejected from a weapon. Further, the computing device 502 may detect an amount of bend falls below the first threshold and, for example, unload the virtual weapon. The computing device 502 may also output an associated haptic effect configured to, for example, simulate removing an empty clip from a weapon.

In some embodiments, the computing device 502 may be configured to simulate physical interactions with a virtual object output on the touch-screen display 504. The virtual object may comprise any type or number of objects, for example, buttons, sliders, knobs, lists, or menus. For example, if the computing device 502 is in a rest state, upon the user interacting with the virtual object, the computing device 502 may execute an associated function. For instance, upon the user sliding a virtual slider upwards, the computing device 502 may increase the volume of audio output via speakers. In some embodiments, upon the user deforming the computing device 502, the computing device 502 may enter an "exploration mode." The exploration mode may be configured to allow a user to interact with and perceive a virtual object, without executing a function associated with the virtual object. For example, the computing device 502 may detect a deformation and enter exploration mode. The user may then explore the touch-screen display 504 with a finger. Upon the user interacting with the virtual slider, the computing device 502 may output a haptic effect comprising a rubber texture and/or changing the perceived coefficient of friction on the surface of the touch-screen display 504. In this manner, a user may be able to perceive the virtual slider, without looking at the touch-screen display 504 (and without executing an associated function).

In some embodiments, upon the user deforming (e.g., squeezing or bending) the computing device 502, the computing device 502 may enter an "editing mode." For example, while the computing device 502 is in its rest state, the virtual locations of one or more virtual objects output on the touch-screen display 504 may be locked or immovable. The computing device 502 may detect a deformation and enter the editing mode. The computing device 502 may also output a haptic effect comprising a continuous, pulsed vibration (e.g., to alert the user that the computing device 502 is in the editing mode). The editing mode may allow the user to interact with the touch-screen display 504 to move a virtual object's location. For example, the user may use a finger to drag an icon from a first location to a second location. In some embodiments, the user may unbend or stop squeezing the computing device 502. In response, the computing device 502 may exit the editing mode. In some embodiments, upon exiting the editing mode, the computing device 502 may stop outputting the pulsed vibration, e.g., to indicate that the computing device 502 is no longer in editing mode.

In some embodiments, the computing device 502 may simulate different physical interactions with a virtual object based on different deformations of the computing device 502. For example, the virtual object may comprise a carbonated beverage can (e.g., a soda or beer can). The computing device 502 may be configured to detect a bend above a first threshold and virtually release carbonation from the can. The computing device 502 may also output a haptic effect associated with releasing carbonation in a can (e.g., a low-magnitude vibration with a longer duration). The computing device 502 may detect a bend above a second threshold and virtually pop the tab of the can. The computing device 502 may also output a haptic effect configured to simulate opening the tab of a can (e.g., a high-magnitude vibration with a shorter duration). The computing device 302 may detect a twist and virtually pour liquid from the can. The computing device 502 may also output a haptic effect configured to simulate pouring of a fluid (e.g., a flow sensation). Further, in some embodiments, the user may interact with the virtual can via the touch-screen display 504. The computing device 502 may output haptic effects based on the state of the virtual can—whether the carbonation has been released, the tab has been opened, or the beverage has been poured.

In some embodiments, the virtual object may comprise a car in a racing game. The user may move a finger along the touch-screen display 504 to move a virtual gear shifter from a park position into a drive position. The computing device 502 may detect the gesture and start the virtual car. The computing device 502 may also output a haptic effect, for example, configured to simulate the rumble of an engine starting (e.g., a long, low frequency vibration). In some embodiments, as the user bends the computing device 502, the computing device 502 may accelerate the virtual car. The computing device 502 may output a haptic effect, for example, configured to simulate the increasing speed of a car. Upon the user unbending the computing device 502, the computing device 302 may apply the brakes. The computing device 502 may output a haptic effect, for example, configured to simulate a car braking (e.g., a vibration pattern associated with an anti-lock breaking system).

In some embodiments, the computing device 502 may comprise multiple user interface levels. A user may change between user interface levels by deforming the computing device 502. The user may interact with a virtual object associated with one or more user interface levels by interacting with the touch-screen display 504, the button 506, or another user interface component. For example, the computing device 502 may execute a mapping application. Upon the user bending the computing device 502 an amount above a first threshold, the computing device 502 may zoom in on the map. Upon the user bending the computing device 502 an amount above a second threshold, the computing device 502 may output previously hidden information, such as city, town, and road names. Upon the user bending the computing device 502 an amount above a third threshold, the computing device 502 may output additional information, such as nearby gas stations, restaurants, movie theaters, police stations, or hospitals. The computing device 502 may output a confirmatory haptic effect, such as a light vibration, as it switches between the user interface levels. In some embodiments, a user may interact with the touch-screen display 504 to, for example, select a location, such as a city, town, road, gas station, restaurant, movie theater, police station, or hospital. The computing device 502 may detect the selection and, for example, output driving directions to the location. The computing device 502 output an associated haptic effect, for example, indicative of poor driving conditions.

In some embodiments, the computing device 502 may be executing a camera application. The computing device 502 may include a camera on the back of the computing device 502 for capturing scenes using the camera application. A user may point the camera at an object and bend the computing device 502 to, for example, change the camera's zoom or focus level. The computing device 502 may detect the deformation and output transition haptic effects, for example comprising detents or clicks, as the zoom level exceeds or falls below thresholds. For example, the computing device 502 may output a click as the zoom level increases from 2× to 4×. The computing device 502 may output another click as the zoom level increases from 4× to 8×. This may allow the user to determine the zoom level without viewing the touch-screen display 504. In some embodiments, the user may interact with the touch-screen display 504 and/or the button 506 while the computing device 502 is still deformed, for example, to take the photograph. In other embodiments, the computing device 502 may save the zoom or focus level. The user may unbend the computing device 502 and, while the computing device 502 is no longer deformed, interact with the touch-screen display 504 and/or the button 506 to take the photograph. The computing device 502 may detect the user interaction and take the photograph using the previously saved zoom or focus level. In some embodiments, the computing device 502 may output an associated haptic effect, e.g., a haptic effect configured to simulate the movement of a camera shutter or a lens.

In some embodiments, the computing device 502 may output one or more haptic effects configured to facilitate user interactions with user interface controls (e.g., touch-screen display 504 or button 506). For example, the computing device 502 may output a virtual keyboard associated with a text messaging, chat, or e-mail application executing on the computing device 502. In some embodiments, the computing device 502 may detect a user squeezing the computing device 502 and, for example, initiate a "swipe" input mode. A swipe input mode allows a user to input words by sliding a finger along the virtual keyboard from the first letter of a word to its last letter, lifting a finger only between words. The computing device 502 may output an associated haptic effect, for example, configured to decrease the perceived coefficient of friction on the surface of the touch-screen display 504. This may allow the user to more easily move a finger along the surface of the touch-screen display 504 to input a message.

In the embodiment described above, upon the user interacting with the touch-screen display 504 to enter the message, the computing device 502 may output another haptic effect. For example, the computing device 502 may output a rubber texture over vowels. This may allow the user to determine when the user's finger is positioned over a vowel, which may make it easier for the user to input the message. In some embodiments, the user may stop squeezing the computing device 502 to exit swipe mode. The computing device 502 may detect that the user is no longer squeezing the computing device 502 and output one or more associated haptic effects. For example, the computing device 502 may output a haptic effect comprising two pulsed vibrations, e.g., to indicate to the user that that the computing device 502 is no longer in swipe mode.

Figure 6:
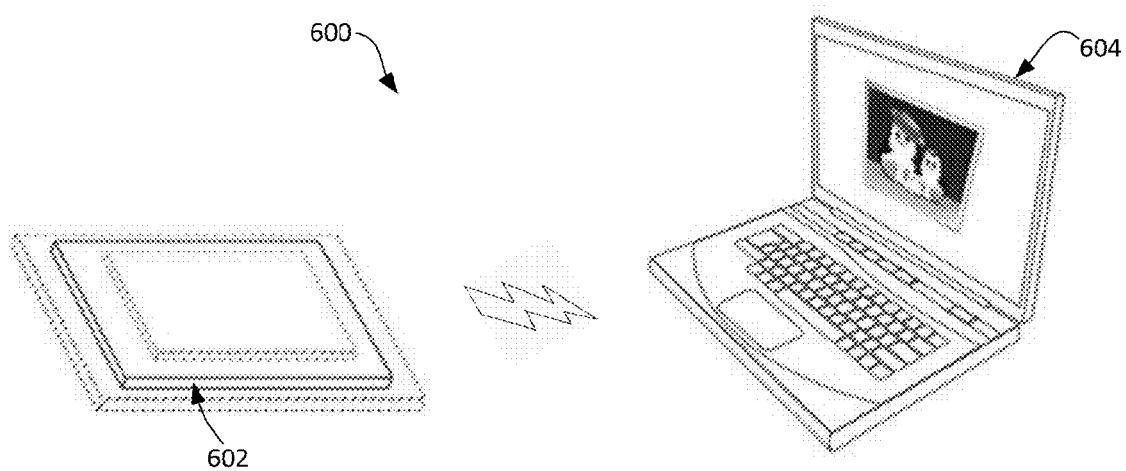
FIG. 6 shows still another embodiment of a system for deformation-based haptic effects.

FIG. 6 shows still another embodiment of a system 600 for deformation-based haptic effects. The system 600 comprises a computing device 602 (e.g., the computing device 201 of FIG. 2). The computing device 602 is flexible, foldable, bendable, twistable, stretchable, squeezable, rollable, and/or otherwise deformable. The computing device 602 comprises one or more user interface controls (e.g., a touch-sensitive surface, a touch pad, a button, a directional pad, or a joystick). In the embodiment shown in FIG. 6, the computing device 602 is communicatively coupled to a computing system 604.

The computing system 604 may output one or more virtual objects. For example, the computing system 604 may be executing a photo album application and output a virtual photograph. The user may interact with the one or more user interface controls on the computing device 602 to manipulate the photograph or otherwise interact with the photo album application. For example, the user may tap on an area of a touch-sensitive surface on the computing device 602 to select an associated photo album widget, e.g., a button configured to change the size of the virtual photograph. The computing device 602 may output an associated haptic effect, for example a vibration to notify the user that the button has been selected. In some embodiments, the computing device 602 may be configured to detect a deformation comprising a squeeze and transmit a signal to the computing system 604 configured to decrease the size of the photograph. The computing device 602 may also be configured to detect a deformation comprising a stretch and transmit a signal to the computing system 604 configured to increase the size of the photograph. In some embodiments, the computing device 602 may output an associated haptic effect. For example, if the photograph is at its maximum size, the computing device 602 may output a haptic effect configured to resist against the user further stretching the computing device 602.

In some embodiments, the computing system 604 may output a webpage via a web browser. The web page may comprise one or more links. A user may interact with the computing device 602 (e.g., the touch-sensitive surface) to select a link. In some embodiments, the computing device 602 may output a haptic effect associated with the interaction. For example, upon the user's finger hovering over the link, the computing device 602 may output a haptic effect configured to change the perceived coefficient of friction on the surface of the touch-sensitive surface. This may guide the user as to the location of links on the webpage without the user having to look at the display of the computing system 604. Once a link has been selected, the user may deform the computing device 602. The computing device 602 may detect the deformation and cause the computing system 604 to execute an associated function. For example, if the deformation comprises an upwards bend, the computing device 602 may cause the computing system 604 to open the webpage associated with the link in a new browser window. If the deformation comprises a downwards bend, the computing device 602 may cause the computing system 604 to open the webpage associated with the current browser window.

Illustrative Methods for Deformation-Based Haptic Effects

Figure 7:
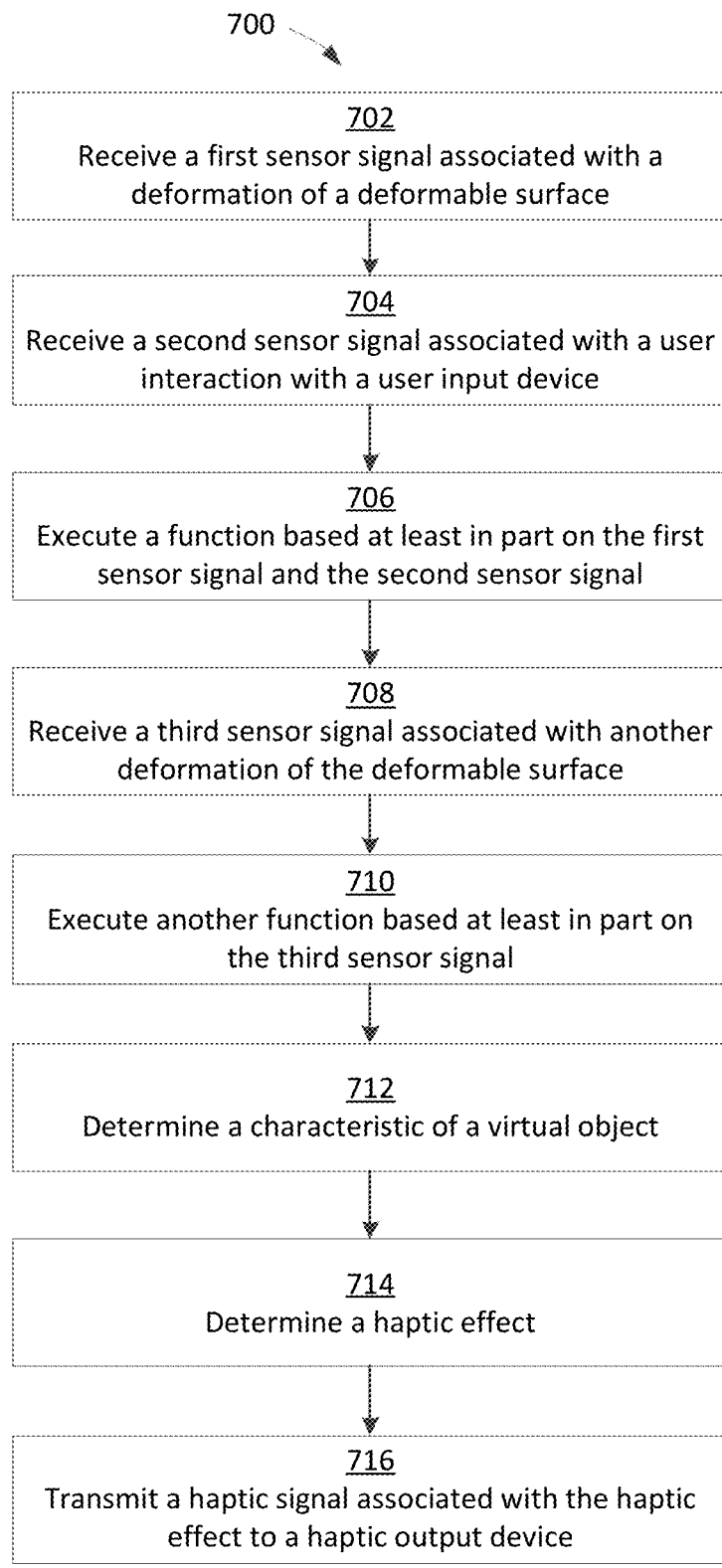
FIG. 7 is a flow chart of steps for performing a method for providing deformation-based haptic effects according to one embodiment.

FIG. 7 is a flow chart of steps for performing a method for providing deformation-based haptic effects according to one embodiment. In some embodiments, the steps in FIG. 7 may be implemented in program code that is executed by a processor, for example, the processor in a general purpose computer, a mobile device, or a server. In some embodiments, these steps may be implemented by a group of processors. In some embodiments one or more steps shown in FIG. 7 may be omitted or performed in a different order. Similarly, in some embodiments, additional steps not shown in FIG. 7 may also be performed. The steps below are described with reference to components described above with regard to computing device 101 shown in FIG. 1.

The method 700 begins at step 702 when the processor 102 receives a first sensor signal associated with a deformation of a deformable surface from a deformation sensor 134. For example, the computing device 101 may be outputting a user interface (e.g., via a display integrated with the touch-sensitive surface 116) comprising one or more virtual objects (e.g., a button, paintbrush, line, rectangle, circle, icon, menu, image, or text). In some embodiments, deforming the computing device 101 may be associated with zooming in or out on a virtual object. A user may bend the computing device 101 upwards to zoom in on a virtual button. The deformation sensor 134 may detect the upwards bend and transmit an associated sensor signal to the processor 102.

The method 700 continues at step 704 when the processor 102 receives a second sensor signal associated with a user interaction with a user input device from a sensor (e.g., I/O 112, sensor 130, or touch sensor 108). For example, in the above-mentioned user interface embodiment, the user may tap on the touch-sensitive surface 116 on a location associated with the virtual button. The touch-sensitive surface 116 may detect the tap and transmit an associated sensor signal to the processor 102.

The method 700 continues at step 706 when the processor 102 executes a function associated with the first sensor signal and the second sensor signal. For example in the above-mentioned user interface embodiment, a user may be unable to execute a function associated with the virtual button unless the user deforms the computing device 101. Upon the processor 102 receiving the first sensor signal associated with the upwards bend, the processor 102 may enable user interactions with the virtual button. Upon the processor 102 receiving the second sensor signal associated with the tap, the processor 102 may execute a function associated with the virtual button. For example, the processor 102 may open a word processing application associated with the virtual button.

The processor 102 may determine the function to execute via an algorithm, lookup table, function profile, and/or any other suitable method. For example, in some embodiments, the processor 102 may determine the function via an algorithm or lookup table stored in memory 104. The processor 102 may consult a lookup table and associate a specific sensor signal or combination of sensor signals (e.g., sensor signals from the deformation sensor 134, sensor 130, touch sensor 108, etc.) with particular functions. For instance, in the above-mentioned user interface embodiment, in response to the user bending the computing device 101, the processor 102 may consult the lookup table to determine a function comprising enabling user interactions with virtual objects within the user interface. In response to the user tapping on a location on the touch-sensitive surface associated with the virtual button, the processor 102 may consult the lookup table to determine a function comprising opening a word processing application. The processor 102 may combine these determinations and execute a function comprising opening the word processing application.

In some embodiments, the processor 102 may determine the function based on a profile. For example, the computing device 101 may store associated "function profiles" in which a user can assign deformations the user would like associated with particular functions. For example, in some embodiments, the computing device 101 may store a deformation (e.g., an arc, twist, squeeze, fold, bend, stretch, or compression) and/or user input (e.g., button press, interaction with touch-sensitive surface 116, or joystick interaction) the user would like associated with a particular function (e.g., entering a swipe mode, an editing mode, zooming in or out on virtual objects, focusing a camera, executing game functions, changing program settings). In such an embodiment, the processor 102 may consult with the user's function profile to determine which function to perform. For example, if the user's function profile comprises a bend associated with transmitting loading a virtual weapon, in response to the user bending the computing device 101, the processor 102 may determine a function comprising loading a virtual weapon.

The method 700 continues at step 708 when the processor 102 receives a third sensor signal associated with another deformation of the deformable surface from the deformation sensor 134. For example, in the above-mentioned user interface embodiment, the user may bend the computing device 101 further upwards, for instance, to open a new, blank document within the word processing application. The deformation sensor 134 may detect the additional upwards bend and transmit an associated sensor signal to the processor 102.

The method 700 continues at step 710 when the processor 102 executes another function based at least in part on the third sensor signal. For example, in the above-mentioned user interface embodiment, the processor 102 may receive the third sensor signal and open a new, blank document within the word processing application. In some embodiments, the processor 102 may determine the function to execute via an algorithm, lookup table, function profile, or any other suitable method (e.g., using any of the methods described above with respect to step 706).

The method 700 continues at step 712 when the processor 102 determines a characteristic of a virtual object. The processor 102 may determine the size, shape, color, texture, priority, location, content, or other characteristic of the virtual object. For example, in the above-mentioned user-interface embodiment, the processor 102 may determine that the virtual button comprises a word processing application logo. In some embodiments, the processor 102 may determine a priority associated with the virtual object. For example, in the above-mentioned user-interface embodiment, the processor 102 may determine that the virtual button is associated with a home bar in the user interface output on the display. In some embodiments, the processor 102 may determine that virtual objects associated with the home bar are more important or have a higher priority than virtual objects elsewhere in the user interface.

The method 700 continues at step 714 when the processor 102 determines a haptic effect. In some embodiments, the processor 102 may determine the haptic effect based at least in part on a sensor signal (e.g., from I/O 112, sensor 130, deformation sensor 134, or touch sensor 108), a function, the characteristic of the virtual object, and/or an event. For example, the processor 102 may determine the haptic effect based on the first sensor signal, the second sensor signal, and/or the third sensor signal.

In some embodiments, the processor 102 may rely on programming contained in haptic effect determination module 126 to determine the haptic effect. For example, in some embodiments, the haptic effect determination module 126 may comprise a lookup table. In some embodiments, the haptic effect determination module 126 may consult the lookup table and associate sensor signal characteristics (e.g., magnitude, frequency, duration, or waveform), functions, or events with particular haptic effects. For example, in the above-mentioned user-interface embodiment, the haptic effect determination module 126 may associate a function comprising opening an application with a haptic effect comprising a short vibration (e.g., to indicate to the user the application has been opened). As another example, in the above-mentioned user-interface embodiment, the haptic effect determination module 126 may associate a function comprising opening a word processing application with a haptic effect comprising decreasing the coefficient of friction on the touch-sensitive surface 116. This may make it easier for the user to input text into the word processing application using a virtual keyboard.

In some embodiments, the processor 102 may determine the haptic effect based on if, or how much, the computing device 101 is flexed, twisted, squeezed, stretched, folded, bent, or otherwise deformed. For example, in one such embodiment, if the computing device 101 is bent more than 20 degrees, the processor 102 may determine a haptic effect comprising resisting further bending of the computing device 101. For instance, in the above-mentioned user interface embodiment, bending the computing device 101 more than 20 degrees may not be associated with executing any function. If the user bends the computing device 101 20 degrees, the computing device 101 may output a haptic effect configured to resist further bending (e.g., to prevent damage to the computing device 101 or superfluous user interactions). This may notify the user that there are no further commands the user can execute by continuing to bend the computing device 101.

In some embodiments, the computing device 101 may store associated "haptic profiles" in which a user can determine and save in memory 104 a "profile" of the haptic effects the user would like associated with particular events, user interactions, and/or functions. For example, in one embodiment, a user can select from a list of options which haptic effect the user would like associated with flexing, bending, folding, or other deformations of the computing device 101. In some embodiments, the list may comprise, for example, haptic effects such as assist deformation, resist deformation, high-magnitude vibration, low-magnitude vibration, or a simulated texture. In such an embodiment, the processor 102 may consult with the user's haptic profile to determine which haptic effect to generate. For example, if the user's haptic profile associates bending the computing device 101 with a haptic effect comprising a high-magnitude vibration, in response to the user bending the computing device 101, the processor 102 may determine a haptic effect comprising a high-magnitude vibration.

In some embodiments, the processor 102 may determine the haptic effect based on the characteristic of the virtual object. For example, in the above-mentioned user-interface embodiment, the processor 102 may output a haptic effect associated with the virtual texture of the virtual button. For instance, if the virtual button has a virtual texture that is bumpy, the processor 102 may output a haptic effect configured to simulate a bumpy texture.

The method 700 continues at step 716 when the processor 102 transmits a haptic signal associated with the haptic effect to a haptic output device 118. In some embodiments, the processor 102 may rely on programming contained in the haptic effect generation module 128 to generate the haptic signal. The processor 102 may transmit the haptic signal to the haptic output device 118 to output a haptic effect.

In some embodiments, the processor 102 may transmit a plurality of haptic signals to one or more haptic output devices 118 in order to generate the haptic effect. For example, in the above-mentioned user interface embodiment, upon the word processing application opening, the processor 102 may transmit a first haptic signal configured to cause a haptic output device 118 to unbend the computing device 101 until the computing device 101 is flat (e.g., to make it easier for the user to input text via the virtual keyboard). Additionally or alternatively, the processor 102 may transmit a second haptic signal configured to cause another haptic output device 118 to output a rubber texture on the touch-sensitive surface 116 in locations associated with virtual keyboard keys. This may allow a user to determine the location of virtual keyboard keys, without having to look at the display.

Advantages of Deformation-Based Haptic Effects

There are numerous advantages of deformation-based haptic effects. Such systems may allow the user to make a state determination (e.g., determine the mode a device is in) without looking at the device. Thus, the user may be able to maintain focus on other tasks. For example, a user may bend a device and receive haptic feedback indicating the state of the device. Based on the haptic feedback, the user may be able to determine what options are available in a program or a user interface, without having to visually focus on the display. Similarly, haptic effect may serve as a confirmation that an operation is available, has been completed, or is of a certain level of importance.

In some embodiments, deformation-based haptic effects may allow a user to perform multiple operations substantially simultaneously (rather than sequentially), leading to more unique, effective, and intuitive user interfaces. For example, the user may be able to change a program setting by deforming the computing device with one hand, while simultaneously interacting with a user interface device (e.g., a touch-sensitive surface, button, joystick, trigger, or switch) with another hand, e.g., to perform a function associated with the program setting. For instance, a user may be able to cycle through virtual weapons in a video game by bending the computing device with one hand. The user may be able to fire a selected virtual weapon by pressing a virtual "fire" button (e.g., output on a touch-screen display of the computing device) with another hand. This may allow a user to easily and quickly cycle between and fire virtual weapons, while requiring relatively little movement of the user's hands. Conversely, with traditional user interfaces, a virtual button for cycling through weapons may be distant and inconveniently placed from the "fire" button. The user may have to move a hand back and forth between the buttons to switch between and fire virtual weapons, increasing the cognitive load on the user, slowing down the user, and increasing the likelihood of the user making an error (e.g., missing the button).

In some embodiments, deformation-based haptic effects may enable non-visual user interfaces. For example, a user may switch between system modes or program settings by deforming the computing device. The computing device may detect the deformation and output associated haptic effects (e.g., pulsed vibrations). The haptic effects may indicate to the user the current system mode or program setting. Upon identifying the desired system mode or program setting, the user may explore a touch-sensitive surface with a finger. If the user's finger interacts with the location of an invisible interface component, the computing device may output an associated haptic effect. For example, if the user interacts with a virtual volume button, the computing device may output a haptic effect comprising a rubber texture. The user may interact with (e.g., tap on the location of) the invisible interface component to perform an associated function (e.g., to increase the volume of a sound output by the computing device). In response, the computing device may perform the function and/or provide the user with haptic feedback, for example, to confirm receipt of the user interaction. In this manner, deformation-based haptic effects may allow a user to execute functions while interacting with a non-visual user interface.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, in which other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:
1. A system, comprising:
a computing device comprising:
   a deformable housing;
   a deformation sensor coupled to the deformable housing and configured to detect a deformation in the deformable housing and transmit a first sensor signal associated with the deformation;
   an input sensor configured to detect an interaction with an input device and transmit a second sensor signal associated with the interaction;
   a processor in communication with the deformation sensor and the input sensor, the processor configured to:
      receive the first sensor signal;
      determine an amount of deformation in the deformable housing based at least in part on the first sensor signal;
      determine a first characteristic of a function to execute based at least in part on the amount of deformation in the deformable housing;
      receive the second sensor signal;
      determine a second characteristic of the function based at least in part on the interaction with the input device;
      cause the function to be executed based at least in part on the first characteristic and the second characteristic;
      determine a haptic effect based at least in part on the first sensor signal or the second sensor signal; and
      transmit a haptic signal associated with the haptic effect; and
   a haptic output device in communication with the processor, the haptic output device configured to receive the haptic signal and output the haptic effect.

2. The system of claim 1, wherein the deformation comprises rolling, bending, folding, stretching, twisting, or squeezing the deformable surface.

3. The system of claim 1, wherein the processor is further configured to:
   determine a characteristic of a virtual object; and
   determine the haptic effect based at least in part on the amount of deformation in the deformable housing and the characteristic of the virtual object.

4. The system of claim 1, wherein the input device comprises a button, a switch, a trigger, a wheel, a directional pad, or a joystick.

5. The system of claim 1, wherein the haptic output device is coupled to a wearable device that is separate from the computing device, and wherein the wearable device comprises a shoe, an armband, a sleeve, a jacket, glasses, a glove, a ring, a watch, a wristband, an article of clothing, a hat, a headband, or jewelry.

6. The system of claim 1, wherein the haptic effect is configured to resist against deformation of the deformable housing, and wherein the processor is further configured to:
   determine the haptic effect based at least in part on the amount of deformation in the deformable housing; and
   cause the haptic output device to output the haptic effect in response to the deformation in the deformable housing.

7. The system of claim 1, wherein the processor is further configured to:
   receive a third sensor signal associated with another deformation of the deformable surface; and
   cause another function to be executed based at least in part on the third sensor signal.

8. The system of claim 7, wherein the processor is further configured to:
cause another haptic effect to be output via the haptic output device in response to the third sensor signal.

9. A method comprising:
receiving a first sensor signal associated with a deformation of a deformable surface;
determining an amount of deformation in the deformable surface based at least in part on the first sensor signal;
determining a first characteristic of a function to execute based at least in part on the amount of deformation in the deformable surface;
receiving a second sensor signal associated with an interaction with an input device;
determining a second characteristic of the function based at least in part on the interaction with the input device;
executing the function based at least in part on the first characteristic and the second characteristic;
determining a haptic effect based at least in part on the first sensor signal or the second sensor signal; and
causing the haptic effect to be output via a haptic output device.

10. The method of claim 9, wherein the deformation comprises rolling, bending, folding, stretching, twisting, or squeezing the deformable surface.

11. The method of claim 9, wherein the deformable surface is coupled to a computing device and the haptic output device is coupled to a wearable device that is separate from the computing device, and wherein the wearable device comprises a shoe, an armband, a sleeve, a jacket, glasses, a glove, a ring, a watch, a wristband, an article of clothing, a hat, a headband, or jewelry.

12. The method of claim 9, wherein the input device comprises a button, a switch, a trigger, a wheel, a directional pad, or a joystick.

13. A non-transitory computer readable medium comprising program code, which when executed by a processor is configured to cause the processor to:
receive a first sensor signal associated with a deformation of a deformable surface;
determine an amount of deformation in the deformable surface based at least in part on the first sensor signal;
determine a first characteristic of a function to execute based at least in part on the amount of deformation in the deformable surface;
receive a second sensor signal associated with an interaction with an input device;
determine a second characteristic of the function based at least in part on the interaction with the input device;
execute the function based at least in part on the first characteristic and the second characteristic;
determine a haptic effect based at least in part on the first sensor signal or the second sensor signal; and
cause the haptic effect to be output via a haptic output device.

14. The non-transitory computer readable medium of claim 13, wherein the deformation comprises rolling, bending, folding, stretching, twisting, or squeezing the deformable surface.

15. The non-transitory computer readable medium of claim 13, wherein the input device comprises a button, a switch, a trigger, a wheel, a directional pad, or a joystick.

16. The system of claim 1, wherein the processor is configured to cause the function to be executed by transmitting a command to a remote device, the command being configured to cause the function to be executed by the remote device.

17. The system of claim 1, wherein the deformable housing surrounds a perimeter of a rigid housing of the computing device.

18. The system of claim 1, wherein the haptic effect is configured to cause the deformable housing to change in shape.

19. The system of claim 1, wherein the processor is configured to:
increase a characteristic of the haptic effect in response to the deformable housing being deformed in a first direction; and
decrease the characteristic of the haptic effect in response to the deformable housing being deformed in a second direction that is opposite to the first direction.

20. The system of claim 1, wherein the processor is further configured to:
determine a first characteristic of the haptic effect based at least in part on the amount of deformation in the deformable housing; and
determine a second characteristic of the haptic effect based at least in part on the interaction with the input device.

21. The system of claim 1, wherein the processor is configured to:
update a parameter associated with an application executing on the computing device in response to the deformation of the deformable housing; and
determine the first characteristic of the function to be executed based at least in part on the updated parameter.

* * * * *